United States Patent [19]
Jeong

[11] Patent Number: 6,151,393
[45] Date of Patent: Nov. 21, 2000

[54] DEVICE AND METHOD FOR MODULAR MULTIPLICATION

[75] Inventor: Yong-Jin Jeong, Kyunggi-do, Rep. of Korea

[73] Assignee: Samsung Electronics Co., Ltd., Kyungki-do, Rep. of Korea

[21] Appl. No.: 09/085,963

[22] Filed: May 27, 1998

[30] Foreign Application Priority Data

Nov. 18, 1997 [KR] Rep. of Korea ............. 97-60885

[51] Int. Cl.[7] ........................................ G06F 7/38
[52] U.S. Cl. ................ 380/265; 708/491; 708/492
[58] Field of Search ........................ 708/491, 492

[56] References Cited

U.S. PATENT DOCUMENTS

| | | | |
|---|---|---|---|
| 5,210,710 | 5/1993 | Omura | 364/746.1 |
| 5,513,133 | 4/1996 | Cressel et al. | 364/754 |
| 5,742,530 | 4/1998 | Gressel et al. | 364/746 |
| 5,987,489 | 11/1999 | Monier | 708/523 |

*Primary Examiner*—Thomas R. Peeso
*Assistant Examiner*—Todd Jack
*Attorney, Agent, or Firm*—F. Chau & Associates, LLP

[57] ABSTRACT

A method and apparatus are disclosed for performing modular multiplication. Modular multiplication in accordance with the present invention includes precalculating a 2's complement of a given modulus and multiples of the 2's complement and calculating a total magnitude of end-around carries during the modular multiplication. The calculated multiples are selected depending on the total magnitude of the end-around carries, and the selected multiples are added. The disclosure includes array structures in accordance with the present invention. The invention includes an algorithm designed for Rivest-Shamir-Adelman (RSA) cryptography and based on the familiar iterative Homer's rule, but uses precalculated complements of the modulus. The problem of deciding which multiples of the modulus to subtract in intermediate iteration stages has been simplified using simple look-up of precalculated complement numbers, thus allowing a finer-grain pipeline. Regularity and local connections make the algorithm suitable for high-performance array implementation in FPGA's (field programmable gate arrays) or deep submicron VLSI's.

33 Claims, 5 Drawing Sheets

DEVICE AND METHOD FOR MODULAR MULTIPLICATION

BACKGROUND OF THE INVENTION

1. Field of the Invention

The present invention relates generally to cryptography systems for performing encoded communication in various communication services such as wireless local area network communications, computer network communications or the like, and more particularly to a device and method of performing modular multiplication for key encryption.

2. Description of the Related Art

Cryptography systems have been growing in importance recently as a method for improving data security in a variety of communication services. In general, cryptography systems can be classified as one of two types: symmetric and asymmetric [W. Diffie and M. E. Hellman, "*New directions in cryptography*", *IEEE Trans. Inform. Theory*, vol. IT-22, pp. 644–654, November 1976.; See also U.S. Pat. Nos. 4,351,982, 5,349,551, and 5,666,419].

Symmetric cryptography systems use the same key (i.e., the secret key) to encrypt and decrypt a message. The symmetric cryptography systems are often called secret key cryptography (SKC) systems. Examples of SKC systems include DES (Data Encryption System) which is set as a standard by U.S. Commerce Department, IDEA (International Data Encryption Algorithm) [X. Lai and J. L. Massey, "*A proposal for a new block encryption standard*", in *EUROCRYPT '90*, Aarhus, Denmark, Mark 1990.; R. Zimmermann et al, "5 Å, 177 Mb/s *VLSI implementation of International data encryption algorithm*", *IEEE J. Solid-State Circuits*. vol. 29, pp. 303–307. March 1994.], or the like. A problem encountered in the use of SKC systems is the difficulty in the transport of the secret key from the sender to the recipient in a secure and tamperproof fashion. If the secret key could be sent securely, the SKC system would not be needed in the first place because one would simply use that same secure channel to send his message. Frequently, trusted couriers are used as a solution to this problem. Another, more efficient and reliable solution is asymmetric cryptography system.

Asymmetric cryptography systems, called public key cryptography (PKC) systems, use one key (i.e., the public key) to scramble a message and a different key (the private key) to descramble it. These two keys are produced on the basis of mathematics. That is, the keys are mathematically related to each other. The public key is made available to anyone that wishes to use it, while the private key is maintained secretly by the owner. PKC systems are generally preferred over traditional SKC systems, which are presently the standard data encryption technique. PKC systems employ safer key distribution.

The Rivest-Shamir-Adelman (RSA) system [R. L. Rivest, A. Shamir, and L. Adelman, "*A method for obtaining digital signatures and public-key cryptosystems*", *Commun. ACM*, vol. 21, pp. 120–126, February 1978.] is one of the most widely used public key cryptography systems. The core arithmetic operation in RSA cryptography is modular multiplication over a positive integer. Modular multiplication is also a major computation of residue number systems [F. J Tayer, "*Residue arithmetic: A tutorial with examples*", *IEEE Comput. Mag.*, vol. 17, pp. 50–62, May 1984.] as well as other cryptography systems such as IDEA, and Diffie-Hellman key exchange [W. Diffie and M. E. Hellman, "*New directions in cryptography,*" *IEEE Trans. Inform.*, vol. IT-ww, pp. 644–654, November 1976.].

The modular multiplication is represented as follows:

$$F = A \times C \bmod C \quad (1)$$

where, A, B and C are n-bit integers.

Modular multiplication is generally considered a complicated arithmetic operation because of the inherent multiplication and division operations. There are two main approaches to computing modular multiplication: 1) perform the modulo operation after multiplication or 2) during multiplication. The modulo operation is accomplished by integer division in which only the remainder is needed for further computation.

The first approach requires an n×n bit multiplier with a 2n-bit register followed by a 2n×n bit divider. In the second approach, the modulo operation occurs in each iteration step of integer multiplication. The second approach requires only an n×n bit multiplier since the modulo operation performed on the partial product by using a carry-save adder scheme where carries produced in intermediate iteration stages are stored and then propagated in the last stage [C. K. Koc and C. Y. Hung, "*Carry-Save Adders for Computing the Product AB Modulo N*", *Electronics Letters*, vol. 26, No. 13, pp. 899–900, Jun. 21, 1990.; J. Koren, "*Computer Arithmetic Algorithm*", Englewood Cliffs, N.J.: Prentice-Hall, 1993]. The second approach, therefore, requires more addition/substraction computations due to O(n) modulo reduction steps (while the first approach requires more hardware), thereby resulting in long carry chains, which in turn cause latency and lengthy clock cycles.

Numerous proposals involving both approaches have focused on the fast calculation of a long carry chain. Redundant number systems and a higher radix carry-save form are some of the different number representations that have been used for this purpose [N. Takagi, "*A radix-4 modular multiplication hardware algorithm for modular exponentiation*", *IEEE Trans. Comput.*, vol. 41, pp. 949–956, August 1992; A. Vandemeulebroecke et al., "*A new carry-free division algorithm and its application to a single chip 1024-b RSA processor*", *IEEE J. Solid-State Circuit*", *vol.* 25, pp.748–755, June 1990.]. A carry prediction technique has also been used for fast calculation of modular multiplication [E. B. Brickell, "*A fast modular multiplication algorithm with application to two key cryptography*", in *Advances in Cryptology, Proceedings of Crypto 82*, New York: Plenum, 1982, pp. 51–60.].

Since PKC was introduced, many algorithms and hardware structures have been proposed for modular multiplication [S. E. Eldridge and D. Walter, "*Hardware implementation of Montgomery's modular multiplication algorithm*", *IEEE Trans. Comput.*, vol. 42, pp. 693–699, June 1993.]. Several array structures suited for VLSI implementation have also been discussed. [S. E. Eldridge and D. Walter, "*Hardware implementation of Montgomery's modular multiplication algorithm*", *IEEE Trans. Comput.*, vol. 42, pp. 693–699, June 1993.; C. K. Koc and C. Y. Hung, "*Bi-level systolic arrays for modular multiplication*", *J. VLSI Sig. Proc.*, vol. 3, pp. 215–223, 1991; A. Vandemeulebroecke et al., "*A new carry-free division algorithm and its application to a single chip 1024-b RSA processor*", *IEEE J. Solid-State Circuit*, vol. 25, pp. 748–755, June 1990.]. The disclosure of these articles are incorporated herein by reference for better understanding of the related art. Vandemeulebroecke et al. use a modulo after multiplication approach using a signed digit number representation. It consists of two arrays: one for multiplication and the other for integer division. Koc and Hung apply Blackey's algorithm [G. R. Blackey, "*A computer algorithm for the product AB modulo M,*" *IEEE Trans.*

Comput., vol. 32, pp.497–500, 1983] and use a sign-estimation method by looking at the five most significant bits at each iteration stage. Although they derive a bit-level systolic array structure, the latency and clock cycle are relatively long due to the control node which estimates the sign of the intermediate result in each stage.

Eldridge and Walter use Montgomery's algorithm which only works if the modulus is relatively prime to the radix, although this is always the case in RSA.

The above techniques suffer from a drawback that hardware overhead due to their algorithm traits is large, inhibiting them from being put to practical use.

Consequently, a matter of major concern in providing enhanced performance in data encryption systems is directed to modulo operations. More specifically, on how to reduce critical path delay due to long carry chains for the purpose of operational speed improvement and simplified hardware implementation. Improving the long critical path delay on modulo operation depends on how fast carries in the most significant bits (MSBs) required for n-bit substraction can be processed and how much the amount of carry computation can be reduced, since the modulo operation of the modular multiplication is performed by integer division and the division is carried out by consecutive subtractions.

To satisfy the ever growing security requirements of high-speed communications, such as personal communication services and wireless local area networks, a VLSI hardware encryption solution is needed because of 1) high throughput requirement, 2) low-power requirements, 3) a high-volume market, 4) the computation is poorly suited to microprocessors or DSP's, and 5) the problem size is expected to continue to grow.

SUMMARY OF THE INVENTION

It is therefore an object of the present invention to provide a modular multiplier which is suitable for high speed cryptography systems.

It is another object of the present invention to provide a modular multiplier which can be fully pipelined for high performance and can also be easily mapped to linear arrays for various space/time tradeoffs.

It is still another object of the present invention to provide a modular multiplier which has a systolic structure adapted for actual use in VLSI architecture.

It is still another object of the present invention to provide a method capable of performing data encryption using high speed modular multiplication.

To attain the above objects, there are provided novel methods and array structures for performing integer modular multiplication, with application to, but not restricted to, RSA encryption systems.

In one method for performing modular multiplication in accordance with the present invention, a step of precalculating a 2's complement of a given modulus and multiples of the 2's complement and calculating a total magnitude of end-around carries during modular multiplication are included. Then, by selecting the calculated multiples depending on the total magnitude of the end-around carries and adding the selected multiples modular multiplication in accordance with the present invention is performed.

A device for performing modular multiplication includes means for precalculating a 2's complement of a given modulus and multiples of the complement. Also included are means for storing the multiples and means for selecting the calculated multiples depending on a total magnitude of the end-around carries produced during the modular multiplication and means for adding the selected multiples.

An array structure for iteration stages of a modular multiplier in accordance with the present invention includes first, second and third control nodes arranged in a first direction for controlling processing nodes. A first group of processing nodes is placed side by side with the first control node and arranged in a second direction which is orthogonal to the first direction, for performing same operations. A second group of processing nodes is placed side by side with the second control node and arranged in the second direction, for performing same operations. A third group of processing nodes is placed side by side with the third control node and arranged in the second direction, for performing same operations.

Another array structure for iteration stages of a modular multiplier in accordance with the present invention includes first, second and third control nodes arranged in a first direction for controlling processing nodes. First, second and third processing nodes are arranged in parallel and in the first direction. A first group of processing nodes is placed between the first control node and the first processing node and arranged in a second direction which is orthogonal to the first direction, for performing same operations. A second group of processing nodes is placed between the second control node and the second processing node and arranged in the second direction, for performing same operations. A third group of processing nodes is placed between the third control node and the third processing node and arranged in the second direction, for performing same operations.

The method of the present invention uses a carry-save-adder (CSA) scheme. Modulo reduction is performed on each intermediate partial product which results in an output in carry-save format. Regularity and local connections make the method suitable for high-performance array implementation in FPGA's (field programmable gate arrays) or deep submicron VLSI's. The array structures of the present invention employ a plurality of processing nodes.

The processing nodes in each of the embodiments of the present invention can be realized with simple encoders including just one or two full adders and a simple multiplexer. The stored complement numbers need to be precalculated only when the modulus is changed, thus not affecting the performance of the main computation.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DESCRIPTION OF PREFERRED EMBODIMENTS

The present invention employs novel array architectures including architecture facilitating VLSI implementation and enhanced operating methods for performing modular multiplication to provide enhanced data encryption performance. In contrast to Montgomery's modular multiplication approach, for a better understanding of the present invention, a detailed derivation of the underlying algorithms used to practice the present invention is provided in the following section.

Two novel VLSI array architectures for modular multiplication are provided. The idea is similar to Montgomery's algorithm in which he tries to make each partial product a multiple of the radix to simplify the multiplication by the radix just by shifting) by only looking at the least significant bits (LSB), thus requiring a post-processing step to get the final answer. In this application, the most significant bits (MSB) are used to remove higher bit positions while keeping the correct answer in each partial product, keeping it within a predetermined range. Due to the simple translation of the modulo operation into an addition of a precalculated component of the modulus, the modulo during multiplication approach is used with a carry-save adder structure. Multiplexers are provided to choose the precalculated integer depending on a control which is generated in the leftmost node in each stage. Compared to previous works, it is possible to obtain a higher clock frequency mainly owing to the simplified modulo reduction operation.

Derivation of Algorithms for use with the Present Invention

In RSA encryption, the encryption key, or modulus, is a product of two large prime numbers, usually more than 500 bits and should be changed periodically for security reasons. In practice, the key is updated infrequently, for example every few months, weeks, or days, depending on the security requirements. The present invention takes advantage of this fact by providing array modular multipliers which use precomputation of values which are stored and recalled from a look-up table.

The basic concept for the modulo reduction operation according to this invention will be explained and an iterative algorithm will be described in detail in this section. Array structures corresponding to this algorithm will be discussed with reference to the accompanying drawings in a following section.

The basic equation for modulus multiplication is stated as:

$$F = A \times B \bmod C \quad (1)$$

where A, B, C and F are unsigned n-bit integers. The n-bit modulus C is presented by a binary number system as $$C = \sum_{i=0}^{n-1} c_i 2^i$$

where $c_i \in GF(2)$.

In a modulus multiplication algorithm of the present invention, the complement of the n-bit modulus C and its multiples are precalculated and stored, rather than being dynamically calculated during each operation. The 2's complement, K, of the modulus C is defined as follows:

$$K \equiv 2^n \bmod C \quad (2)$$

In other words, any carry of weight $2^n$ can be replaced by an addition of K, which means that the end-around carry implies an extra addition. If K does not change frequently, it is possible to precalculate multiples of K and store them in registers for use in the modulo reduction operation. Note that if the MSB of C is 1, K is equivalent to -C in a 2's complement number system.

To simplify the description of a modular multiplication algorithm using the modulo during multiplication approach according to this invention, a new variable, $K_h$, is introduced to handle multiple end-around carries, i.e., multiples $K_h$ of K. $K_h$ is defined as follows:

$$K_h \equiv h \times K \bmod C \quad (3)$$

where h is a positive integer (1, 2, ...).

From equations (2) and (3), it can be appreciated that $2^{n+j}$ mod C is equal to $2^j \cdot K$ mod C.

Carries can also appear in a combined mode. That is, carries of weight (or bit position) n+1, n+2, etc., as well as carry of weight n, will be generated, and can be represented in the above manner. As an example, if two carries of weight $2^{n+1}$ and one carry of weight $2^n$ are generated, then $(2^{n+1} + 2^{n+1} + 2^n)$ mod $C = 5 \cdot 2^n$ mod $C = 5 \cdot K$ mod $C = K_5$. Thus, when multiples $K_h$ of K have been precalculated and stored in registers, the terms greater than $2^n$ in the carry save addition (CSA) scheme, i.e., carries and sums, can be replaced by the multiples $K_h$. The value of term h for each $K_h$ term is calculated in a corresponding iteration stage of the modulo during multiplication. The corresponding $K_h$ term is selected by means of a multiplexer according to the MSB state of the partial product. In an RSA encryption algorithm, since the modulus C (i.e., key) typically does not change for a long time, $K_h$ can be precalculated. But, when the key is changed, the $K_h$ terms have to be updated.

The modular multiplication of equation (1) can be described by an iterative procedure known as Horner's rule, which can be stated as follows:

$$AB \bmod C = A \cdot \sum_{i=0}^{n-1} b_i 2^i \bmod C \quad (4)$$

$$= ((\cdots(b_{n-1}A)2 + b_{n-2}A)2 + \cdots + b_1A)2 +$$

$$= b_0A) \bmod C$$

Equation (4) can be described in a recursive form as follows:

$$P_0 = 0$$

$$P_i = 2P_{i-1} + b_{n-i}A \bmod C \quad (5)$$

where, $P_i$ is a partial product.

The present invention uses a CSA scheme while performing integer multiplication to reduce a carry propagation penalty. In the CSA scheme, a partial sum and a carry sequence are generated in intermediate stages and the carry propagation occurs only at the last stage. The basic element of the CSA scheme is a full adder (FA) which is often called a (3, 2) counter. The full adder accepts three inputs, referred to here as $s_i$, $c_i$, $x_i$ (associated with weight $2^i$), and produces two outputs, carry $c_o$ (with weight $2^{i+1}$) and sum $s_o$ (with weight $2^i$). The arithmetic operation of the (3, 2) counter can thus be described by the familiar expression:

$$2c_o + s_o = s_i + c_i + x_i \quad (6)$$

where "+" means an algebraic (not Boolean) addition.

Using the CSA scheme, a carry of weight $2^n$ in the leftmost node in each stage can be obtained. As shown in equation (1), this carry can be replaced by the addition of the integer K for a modulo operation.

From equation (5), a partial product $P_i$ can be denoted by $$P_i \equiv 2C_i + S_i \tag{7}$$

then, the valid range of $P_i$ is $0 \leq P_i \leq 3 \cdot 2^n - 3$. This means $P_i$ is allowed to be greater than modulus C at intermediate stages.

Equation (3) contains two modulo reduction steps and can be written by introducing a new partial product term $T_i$ as follows:

<Algorithm I> i) $T_i = 2P_{i-1} \bmod C$ ii) $P_i = (T_i + b_{n-1}A) \bmod C$

But, step ii) cannot be implemented by the CSA scheme because it has four operands to be added. Note that the modulo operation implies at least one extra addition of K. This can be solved by dividing the step ii) into two steps as:

<Algorithm II> i) $T_i = 2P_{i-1} \bmod C$ ii-a) $T_i^* = T_i + b_{n-1}A$ ii-b) $P_i = T_i^* \bmod C$ In step i) of the algorithm II, $2P_{i-1}$ implies one $2^{n+1}$ term (i.e., a carry $c_{i-1}^{n-1}$ of bit position n-1) and two $2^n$ terms (i.e., a sum $s_{i-1}^{n-1}$ of bit position n-1 and a carry $c_{i-1}^{n-2}$ of bit position n-2), which can generate a maximum of $4 \cdot 2^n$. In step ii-a), the modulo operation cannot be performed because there are already three operands: two from $T_i$ in carry save form, and one for A depending on $b_{n-i}$. Instead it is desirable to pass through the MSB carry of $T_i$ to step ii-b). So, in step ii-b), at most $2 \cdot 2^n$ (one passed from $T_i$ and another newly generated in $T_i^*$) will be obtained as end-around carries. In both the steps i) and ii-b), only one additional operand is allowed. That is why the $K_h$'s are precalculated instead of adding K multiple times.

To explain algorithm II more formally, $\sigma(P_i)$ is defined as follows:

$$\sigma(P_i) \equiv P_i - h \cdot 2^n + K_h \tag{8}$$

where, $h = f(x_1, x_2, x_3, \ldots, x_r)$ and the function $f(\cdot)$ calculates the total magnitude of end-around carries, and $x_1, x_2, x_3, \ldots, x_r$ are bit variables (always carries and sums of the MSB position) which contribute to the translation of equation (1). Thus the function $f(\cdot)$ can be described as:

$$f(x_1, x_2, x_3, \cdots, x_r) = \sum_{k=1}^{r} \alpha_k x_k \tag{9}$$

where $\alpha_k = 1$ if $x_k$ has weight $2^n$, $\alpha_k = 2$ if the weight is $2^{n+1}$, $\alpha_k = 4$ if the weight is $2^{n+2}$, and so on. In other words, $\sigma(P_i)$ replaces $h \cdot 2^n$ with $K_h$ which is precalculated.

Using equation (8), algorithm II can be rewritten as follows:

<Algorithm III> i) $T_i = 2P_{i-1} \bmod C$ ii-a) $T_i^* = T_i + b_{n-1}A$ ii-b) $P_i = \sigma(T_i^*)$

Array Structure Embodiments

Figure 1:
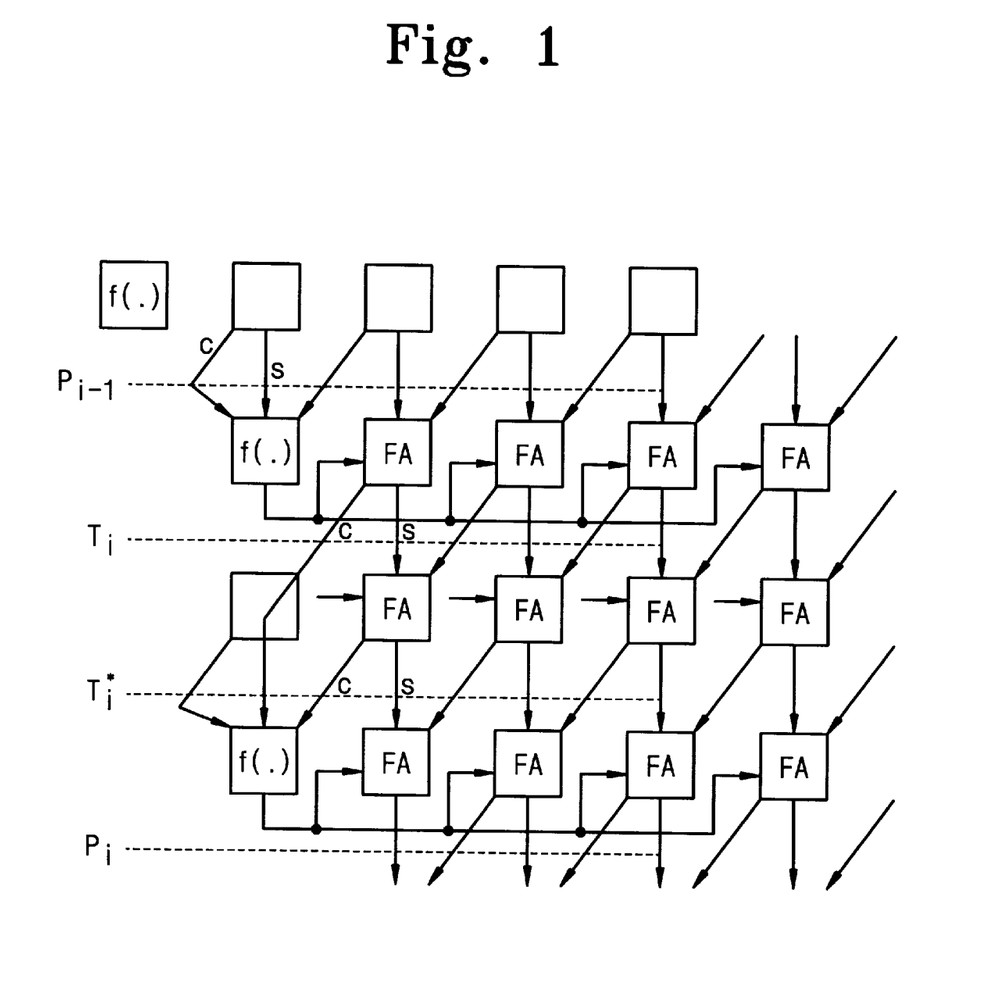
FIG. 1 is a diagram illustrating an iteration stage for the modular multiplication according to this invention.

The algorithms just described can be implemented by processing arrays formed in accordance with the present invention. FIG. 1 illustrates an iteration stage for performing modular multiplication according to this invention. As shown in the figure, the function $f(\cdot)$ of the above algorithm III is for step i), $f(\cdot) = 2c_{i-1}^{n-1} + s_{i-1}^{n-1} + c_{i-1}^{n-2}$ for step ii-b), $f(\cdot) = \gamma_i^{n-1} + \gamma_{i^*}^{*n-1}$ where $\gamma_i^{n-1}$ and $\gamma_{i^*}^{*n-1}$ are the MSB carries of $T_i$ and $T_{i^*}$, respectively, and both have the weight $2^n$.

As described above, the calculation method of the function $f(\cdot)$ according to this invention is simplified compared to previous techniques so that the clock cycle can be reduced. If the transmittent signals are propagated to each processing node through other nodes, an array structure realizable as a parallel array multiplier, can be obtained.

Figure 2A:
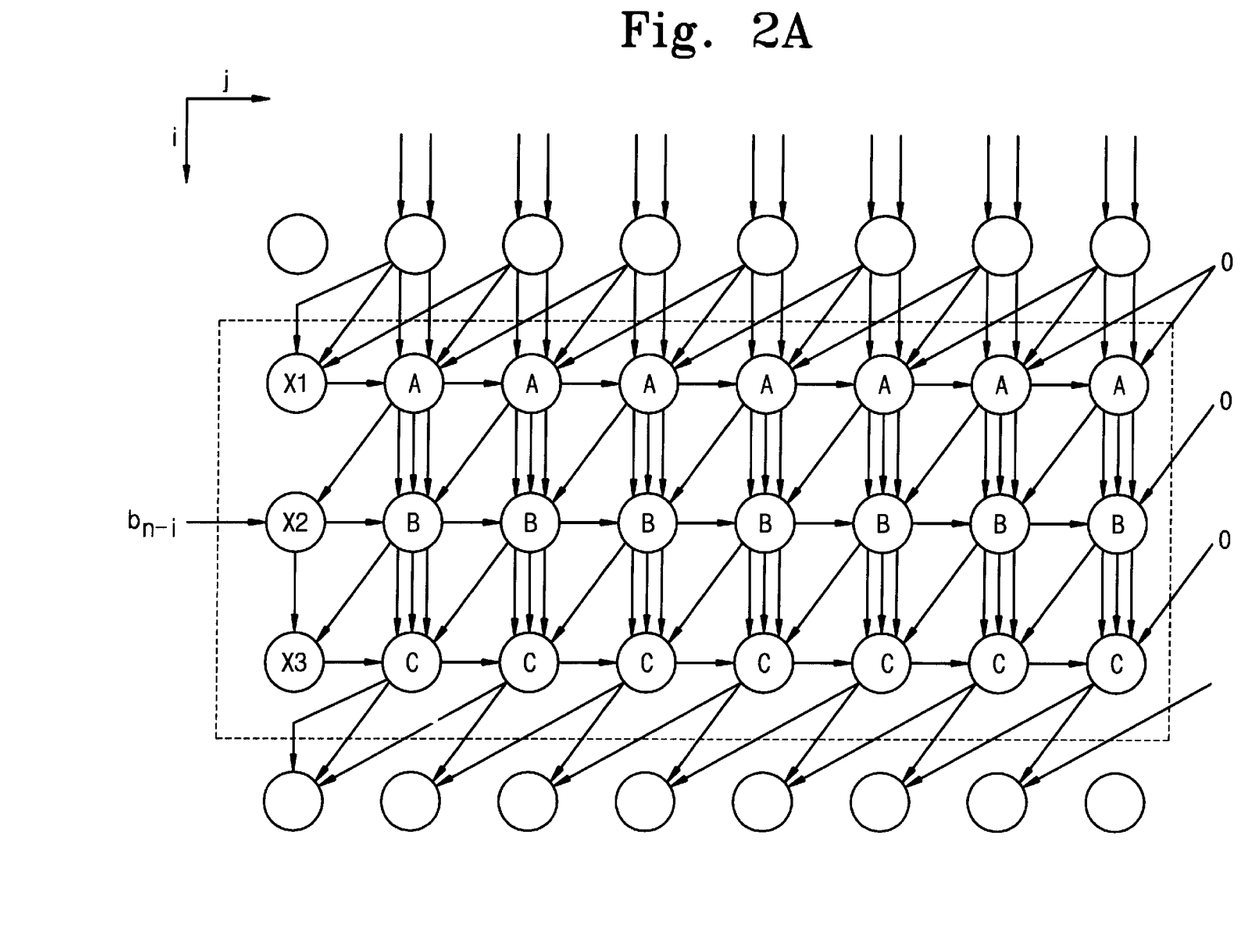
FIG. 2A is a dependence graph illustrating an array structure for the modular multiplication according to an embodiment of the present invention.

FIG. 2A illustrates a single stage, locally-connected structure of a modular multiplier array formed in accordance with the present invention which can be directly implemented as a parallel array multiplier. Referring to FIG. 2A, the array multiplier includes a plurality of control nodes X1, X2 and X3. The control nodes X1, X2 and X3 are arranged in a first direction (column direction).

The array multiplier further includes a first group of processing nodes, referred to as A group processing nodes. Each A group processing node performs the same operations. A first A group processing node 20 is connected to the X1 control node. The balance of the A group processing nodes are arranged and interconnected in a side by side relationship and arranged in a second direction (i.e. a row direction), which is orthogonal to the first direction.

The array multiplier further includes a second group of processing nodes, referred to as B group processing nodes. A first B group processing node 22 is connected to the X2 control node. The balance of the B group processing nodes are interconnected in a side by side relationship and arranged in the second direction. Each of the B group processing nodes perform the same operations.

The array multiplier illustrated in FIG. 2A further includes a third group of processing nodes, referred to as C group processing nodes. A first C group processing node 24 is connected to the X3 control node. The balance of the C group processing nodes are interconnected in a side by side relationship and arranged in the second direction. Each of the B group processing nodes perform the same operations.

Figure 2B:
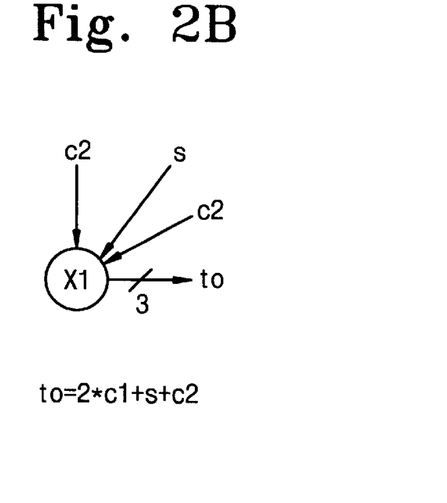
FIGS. 2B to 2G are diagrams illustrating individual node elements employed in the array structure depicted in FIG. 2A and formed in accordance with the present invention.

FIGS. 2B to 2G are diagrams illustrating the functions of the nodes of FIG. 2A. In FIGS. 2B to 2G, "*", "+" and "&" represent algebraic multiplication, algebraic addition and Boolean AND logic operation, respectively. Referring to FIG. 2B, control node X1 receives a first carry (c1), a second carry (c2) and a sum (s) signal as input parameters and provides an output (to). Control node X1 implements the function: to=2*c1+s+c2, which is used to calculate the control value h from the equation $h = f(x_1, x_2, x_3, \ldots, x_r)$ and the function $f(\cdot)$ calculates the total magnitude of end-around carries where $x_1, x_2, x_3, \ldots, x_r$ are bit variables (always carries and sums of the MSB position which are represented by c's and s's in the FIGS.). A simple encoder circuit can be formed to implement control node X1.

Figure 2C:
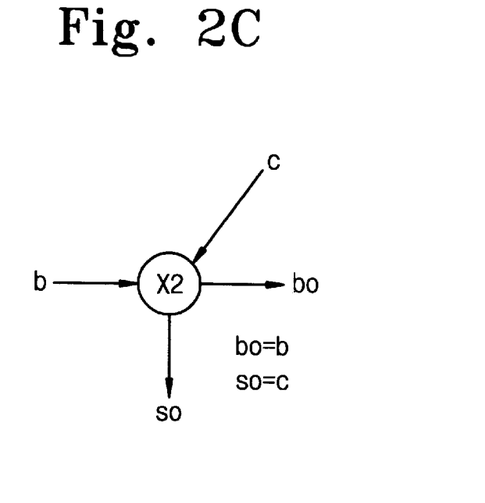

The operation of control node X2 is illustrated in FIG. 2C. Control node X2 essentially functions to pass signals through without processing. Control node X2 receives inputs b and c and provides outputs bo and so. Control node X2 is characterized by the equations bo=b and so=c. Accordingly, this control node can be implemented as a pair of wired connections.

Figure 2D:
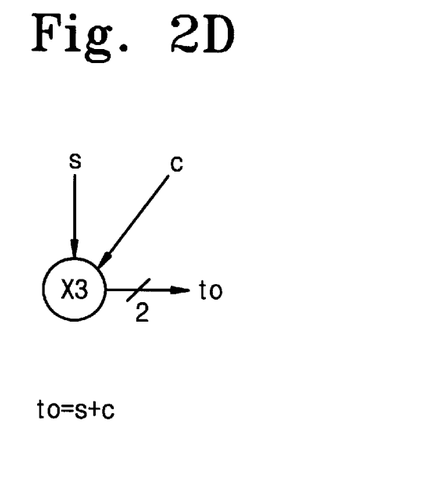

Referring to FIG. 2D, the operation of control node X3 will be described. Control node X3 operates with control node X1 to calculate the control value h as described above. Control node X3 receives a carry input (c) and a sum input (s) and provides an output, to=s+c. As with the control node X1, control node X3 can be implemented using a simple encoder circuit.

Figure 2E:
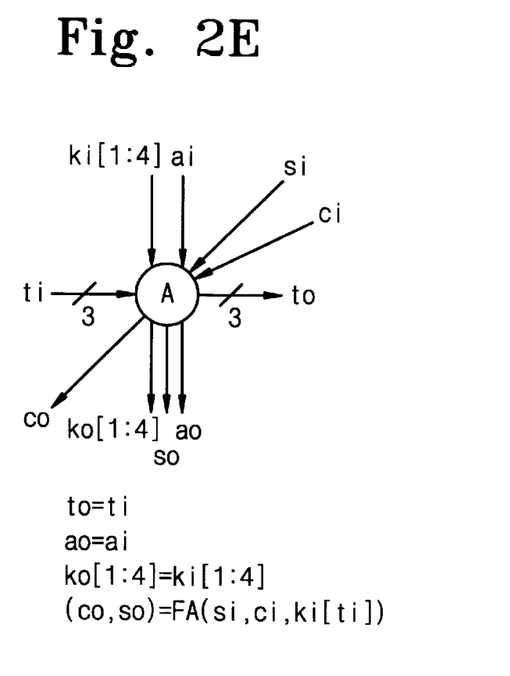

FIG. 2E graphically illustrates the operation of the A group processing nodes. Each A group processing node receives signals ti, ki[1:4], ai, si and ci as input variables and generates output signals to, ao, co, so and ko[1:4]. The A group processing nodes pass the signals ti and ai, performing the functions: to=ti and ao=ai. In addition, each of the A group processing nodes perform the function: (co,so)=FA (si,ci,ki[ti]). These functions can be implemented using a full adder (FA) with a 4×1 multiplexer and an AND gate.

Figure 2F:
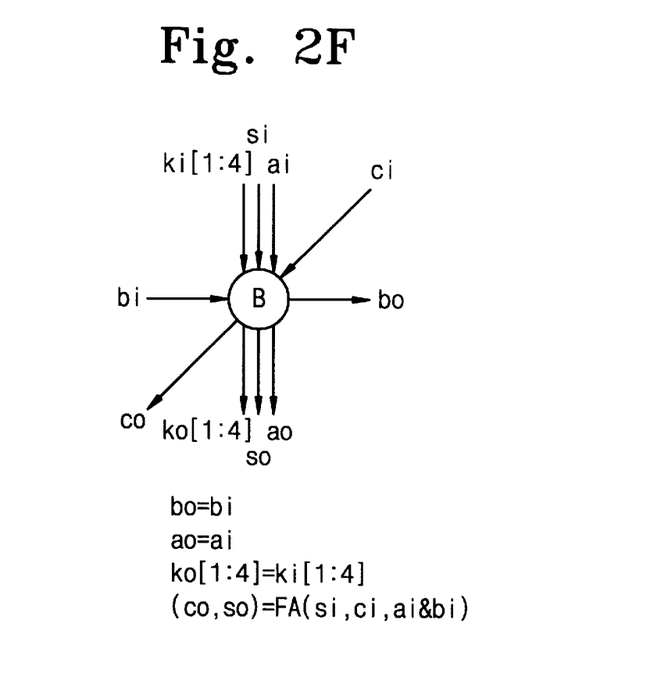

FIG. 2F graphically illustrates the operation of the B group processing nodes. Each B group processing node receives bi, ki[1:4], ai, si and ci as input variables and generates output signals bo, ao, co, so and ko[1:4]. The B group processing nodes pass the signals bi and ai, performing the functions: bo=bi and ao=ai. In addition, each of the B group processing nodes performs the function: (co,so)= FA(si,ci,ai&bi). These functions can be implemented using a full adder (FA) with an AND gate.

Figure 2G:
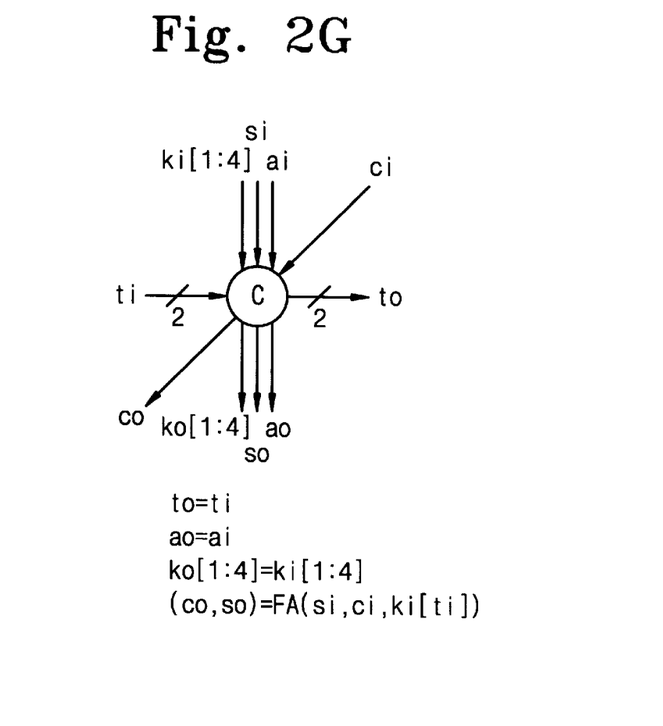

FIG. 2G graphically illustrates the operation of the C group processing nodes. Each C group processing node receives ai, bi, ci, ti and ki[1:4] as input variables and generates output signals ao, co, so and ko[1:4]. The C group processing nodes pass the signals ti and ai, performing the functions: to=ti and ao=ai. In addition, each of the C group processing nodes performs the function: (co,so)=FA(si,ci,ki[ti]). These functions can be implemented using a full adder (FA) with a 2×1 multiplexer and an AND gate. The AND gate is needed in both the A group processing nodes and the C group processing nodes to accept $K_0=0$ when the control value h is zero. The output of control nodes X1 and X3 are used to select the appropriate $K_h$ (i.e. ki [1:4]) value from multiplexers in the processing nodes A and C, respectively.

The multiplexers of the A group processing nodes and the C group processing nodes are controlled by the X1 and X3 control nodes, respectively. In the embodiment of FIG. 2A, there exists a systolic schedule which is not linear due to its skewed connection between the stages.

An example of the operation of the present invention can be illustrated with reference to Table I. Table I presents an example of the present modular multiplication algorithm using n=12, with A=010001000100(=1092), B=010011001101(=1229), and C=100000101001 (=2089). The $K_h$'s are precalculated as $K_3$=K=011111010111(=2007), $K_2$=011110000101(=1925), $K_3$=011100110011(=1843), and $K_4$=011011100001(=1761). From equation (7), the final output is $$P_n = 2(001100010101) + (110111001010)$$

$$= 1001111110100 (= 5108)$$

which equals 930 after modulo reduction to 2089.

TABLE I

| stage | | (carry, sum) | f() | $b_{n-1}$ |
|---|---|---|---|---|
| 0 | $P_0$ | 00 00 00 00 00 00 00 00 00 00 00 00 | | |
| 1 | $T_1$ | 00 00 00 00 00 00 00 00 00 00 00 00 | | |
|   | $T_1$ | 00 00 00 00 00 00 00 00 00 00 00 00 | f(•) = 0 | 0 |
|   | $P_1$ | 00 00 00 00 00 00 00 00 00 00 00 00 | f(•) = 0 | |
| 2 | $T_2$ | 00 00 00 00 00 00 00 00 00 00 00 00 | | |
|   | $T_2$ | 00 01 00 00 01 01 00 00 01 01 00 01 | f(•) = 0 | 1 |
|   | $P_2$ | 00 01 00 00 01 01 00 00 01 01 00 01 | f(•) = 0 | |
| 3 | $T_3$ | 01 01 00 01 01 00 00 01 01 00 01 00 | | |
|   | $T_3$ | 01 00 00 01 01 00 00 01 01 00 01 00 | f(•) = 0 | 0 |
|   | $P_3$ | 01 00 00 01 01 00 00 01 01 00 01 00 | f(•) = 0 | |
| 4 | $T_4$ | 00 01 10 10 01 01 01 10 00 10 01 01 | | |
|   | $T_4$ | 00 10 01 00 01 01 10 00 01 00 01 01 | f(•) = 1 | 0 |
|   | $P_4$ | 01 00 01 00 01 10 00 00 01 00 01 01 | f(•) = 0 | |

TABLE I-continued

| stage | | (carry, sum) | f() | $b_{n-1}$ |
|---|---|---|---|---|
| 5 | $T_5$ | 00 01 01 11 01 01 00 10 00 10 10 01 | | |
|   | $T_5$ | 01 00 10 01 01 01 01 00 01 01 00 01 | f(•) = 1 | 1 |
|   | $P_5$ | 01 01 00 01 01 01 01 00 01 01 00 01 | f(•) = 0 | |
| 6 | $T_6$ | 01 01 10 10 10 10 00 10 01 01 10 01 | | |
|   | $T_6$ | 01 11 01 01 10 01 01 00 10 11 00 10 | f(•) = 1 | 1 |
|   | $P_6$ | 10 01 01 10 00 01 01 01 01 01 01 00 | f(•) = 0 | |
| 7 | $T_7$ | 01 11 01 01 10 01 01 01 01 10 00 10 | | |
|   | $T_7$ | 10 01 01 10 00 01 01 01 10 00 00 01 | f(•) = 2 | 0 |
|   | $P_7$ | 00 10 11 01 01 10 01 11 00 01 01 10 | f(•) = 1 | |
| 8 | $T_8$ | 01 10 10 11 01 11 01 01 01 11 01 01 | | |
|   | $T_8$ | 10 01 01 01 10 01 01 01 10 01 01 01 | f(•) = 1 | 0 |
|   | $P_8$ | 00 10 10 11 01 10 01 11 00 10 10 10 | f(•) = 1 | |
| 9 | $T_9$ | 01 10 10 11 01 11 01 11 01 10 01 01 | | |
|   | $T_9$ | 10 01 01 01 10 01 10 00 10 00 01 01 | f(•) = 1 | 1 |
|   | $P_9$ | 00 10 10 11 01 11 00 10 00 01 10 10 | f(•) = 1 | |
| 10 | $T_{10}$ | 01 10 10 11 10 11 00 01 10 10 01 01 | | |
|    | $T'_{10}$ | 10 10 01 10 10 01 00 10 10 01 01 10 | f(•) = 1 | 1 |
|    | $P_{10}$ | 01 01 11 10 01 10 01 10 00 10 11 01 | f(•) = 1 | |
| 11 | $T_{11}$ | 10 11 01 11 01 11 00 10 01 10 10 01 | | |
|    | $T'_{11}$ | 01 01 10 01 10 01 01 00 10 01 00 01 | f(•) = 1 | 0 |
|    | $P_{11}$ | 01 11 01 11 01 10 01 10 00 10 01 10 | f(•) = 1 | |
| 12 | $T_{12}$ | 01 11 10 11 01 10 00 01 00 11 00 01 | | |
|    | $T_{12}$ | 10 10 01 01 10 00 00 01 01 01 00 01 | f(•) = 2 | 1 |
|    | $P_{12}$ | 01 01 10 10 01 01 00 10 01 10 01 10 | f(•) = 1 | |

Figure 3:
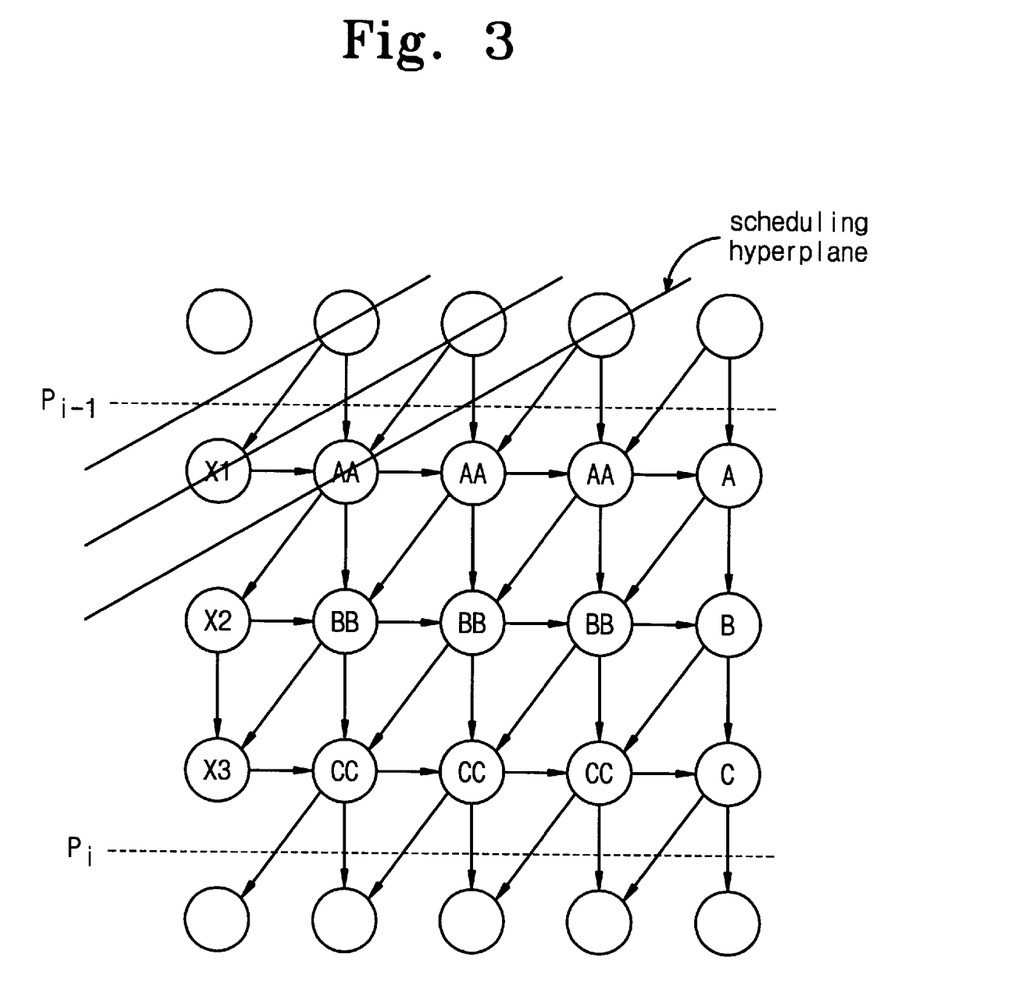
FIG. 3 is a dependence graph illustrating an alternate embodiment of an array structure for a modular multiplier formed in accordance with the present invention.

The array topology of FIG. 2A can be simplified by merging two adjacent processing nodes into one within each group of processing nodes. This is shown in FIG. 3. Referring to FIG. 3, the array includes three rows of processing nodes. These are AA group processing nodes, BB group processing nodes and CC group processing nodes. Each of the processing nodes in these groups have two A, B and C type processing nodes, respectively. This topology provides a linear systolic schedule (along a scheduling hyperplane as indicated in FIG. 3) and is more suitable for implementation in VLSI architecture. If the word length n is an even number, then all nodes except the control nodes will be merged nodes. However, as shown in FIG. 3, if n is an odd number, single nodes A, B and C will remain in the LSB place.

From the embodiments illustrated in FIGS. 2A and 3, those skilled in the art will appreciate that many different one-dimensional arrays (e.g., bit-serial modulo multiplier) can be obtained depending on the mapping functions.

In the array structures of the present invention, the control signals are generated by control nodes which occupy the leftmost node position, The control nodes are formed with a simple architecture which include just four gates (two XOR, one AND, one NOR gate) or two gates (one XOR and one NOR gate). The simplicity of the control nodes gives a much faster clock cycle for the entire array. Thus, in the present invention, it is not the control node, but the processing node which determines the clock cycle. Therefore, higher processing speeds can be achieved. Note that all signals in FIG. 2A except the carry $c_0$ and sum $s_0$ are transmittent signals, which means they are not modified while passing through the array, thus allowing for broadcasting.

What is claimed is:

1. A method for performing modular multiplication, comprising the steps of:

precalculating a 2's complement of a given modulus and multiples of the 2's complement;

calculating a total magnitude of end-around carries of a most significant bit during modular multiplication;

selecting the calculated multiples depending on the total magnitude of the end-around carries; and adding the selected multiples.

2. The method as recited in claim 1, wherein the step of adding includes the step of adding by a full adder the selected multiples.

3. The method as recited in claim 1, wherein the step of selecting the calculated multiples depending on the total magnitude of the end-around carries includes selecting the calculated multiples by employing a multiplexer.

4. A device for performing modular multiplication, comprising: means for precalculating a 2's complement of a given modulus and multiples of the complement;
means for storing the multiples;
means for selecting the calculated multiples depending on a total magnitude of the end-around carries produced during the modular multiplication; and
means for adding the selected multiples.

5. The device as recited in claim 4, wherein the means for adding includes a full adder.

6. The device as recited in claim 4, wherein the means for storing multiples includes at least one register.

7. The device as recited in claim 4, wherein the means for selecting includes a multiplexer.

8. An array structure for iteration stages of a modular multiplier, comprising:
first, second and third control nodes arranged in a first direction for controlling processing nodes;
a first group of processing nodes placed side by side with the first control node and arranged in a second direction which is orthogonal to the first direction, for performing same operations;
a second group of processing nodes placed side by side with the second control node and arranged in the second direction, for performing same operations; and
a third group of processing nodes placed side by side with the third control node and arranged in the second direction, for performing same operations.

9. The array structure as recited in claim 8, wherein the structure is implemented on a VLSI device.

10. The array structure as recited in claim 8, wherein the first and third control nodes include logic circuitry for controlling the first group and third group of processing nodes and the second control node provides a control signal to the second group of processing nodes.

11. The array structure as recited in claim 8, wherein the processing nodes include a full adder for adding inputs for each node.

12. The array structure as recited in claim 11, wherein the processing nodes further comprise an AND gate.

13. The array structure as recited in claim 12, wherein the first and third groups of processing nodes include a multiplexer.

14. The array structure as recited in claim 8, wherein the first and third control nodes include an encoder for generating control signals.

15. The array structure as recited in claim 8, wherein the first control node generates a selection signal, t, based on sums and carries from nodes of a previous iteration stage according to the formula:

$$t=2C_1+S+C_2$$

where $C_1$ and S are a carry and sum, respectively from a first node of the previous iteration stage and $C_2$ is a carry from a second node of the previous iteration stage adjacent to the first node.

16. The array structure as recited in claim 15, wherein the selection signal selects a multiple to be added in the first group of processing nodes.

17. The array structure as recited in claim 8, wherein the third control node generates a selection signal, t, based on a sum S from the second control node and a carry C from a node from the second group of processing nodes according to the formula:

$$t=S+C.$$

18. The array structure as recited in claim 17, wherein the selection signal selects a multiple to be added in the third group of processing nodes.

19. The array structure as recited in claim 8, wherein the second control node passes a bit representing a portion of a modular multiplier, and the second control node passes a carry from the first group of processing nodes.

20. An array structure for iteration stages of a modular multiplier, comprising:
first, second and third control nodes arranged in a first direction for controlling processing nodes;
first, second and third processing nodes arranged in parallel and in the first direction;
a first group of processing nodes placed between the first control node and the first processing node and arranged in a second direction which is orthogonal to the first direction, for performing same operations;
a second group of processing nodes placed between the second control node and the second processing node and arranged in the second direction, for performing same operations; and
a third group of processing nodes placed between the third control node and the third processing node and arranged in the second direction, for performing same operations.

21. The array structure as recited in claim 20, wherein the structure is implemented on a VLSI device.

22. The array structure as recited in claim 20, wherein the control nodes include logic circuitry for controlling the processing nodes.

23. The array structure as recited in claim 22, wherein the logic circuitry includes two XOR gates, one And gate and one NOR gate.

24. The array structure as recited in claim 22, wherein the logic circuitry includes one XOR gates and one NOR gate.

25. The array structure as recited in claim 20, wherein the processing nodes include at least one full adder for adding inputs for each node.

26. The array structure as recited in claim 20, wherein the processing nodes further comprise at least one AND gate.

27. The array structure as recited in claim 20, wherein the first and third groups of processing nodes include at least one multiplexer.

28. The array structure as recited in claim 20, wherein the first and third control nodes include an encoder for generating control signals.

29. The array structure as recited in claim 20, wherein the first control node generates a selection signal, t, based on sums and carries from nodes of a previous iteration stage according to the formula:

$$T=2C_1+S+C_2$$

where $C_1$, and S are a carry and sum, respectively from a first of the previous iteration stage and $C_2$ is a carry from a second node of the previous iteration stage adjacent to the first node.

30. The array structure as recited in claim 29, wherein the selection signal selects a multiple to be added in the first group of processing nodes.

31. The array structure as recited in claim 20, wherein the third control node generates a selection signal, t, based on a sum, S, from the second control node and a carry, C, from a node from the second group of processing nodes according to the formula:

$$T = S + C.$$

32. The array structure as recited in claim 31, wherein the selection signal selects a multiple to be added in the third group of processing nodes.

33. The array structure as recited in claim 20, wherein the second control node passes a bit representing a portion of a modular multiplier, and the second control node passes a carry from the first group of processing nodes.

* * * * *